Nov. 25, 1969 R. D. MARSHALL 3,480,764

OPTICAL COINCIDENCE INFORMATION RETRIEVAL SYSTEM

Original Filed Sept. 18, 1967 7 Sheets-Sheet 1

INVENTOR.
ROGER D. MARSHALL

BY

Strauch Nolan Neale Nies + Kurz
ATTORNEYS

OPTICAL COINCIDENCE INFORMATION RETRIEVAL SYSTEM

Original Filed Sept. 18, 1967 7 Sheets-Sheet 2

INVENTOR
ROGER D. MARSHALL

BY
Strauch Nolan Neale Nies & Kurz
ATTORNEYS

INVENTOR
ROGER D. MARSHALL

BY
Strauch Nolan Neale Nies & Kurz
ATTORNEYS

Nov. 25, 1969 R. D. MARSHALL 3,480,764

OPTICAL COINCIDENCE INFORMATION RETRIEVAL SYSTEM

Original Filed Sept. 18, 1967 7 Sheets-Sheet 4

INVENTOR.
ROGER D MARSHALL

BY

Strauch Nolan Neale Nies + Kurz
ATTORNEYS

INVENTOR
ROGER D. MARSHALL

BY
Strauch Nolan Neale Nies + Kurz
ATTORNEYS

INVENTOR
ROGER D. MARSHALL

BY
Strauch Nolan Neale Nies & Kurz
ATTORNEYS

INVENTOR
ROGER D. MARSHALL

BY
Strauch Nolan Neale Nies + Kurz
ATTORNEYS

United States Patent Office 3,480,764
Patented Nov. 25, 1969

3,480,764
OPTICAL COINCIDENCE INFORMATION RETRIEVAL SYSTEM
Roger D. Marshall, 2256 N. Wakefield St., Arlington, Va. 22207
Original application Sept. 18, 1967, Ser. No. 668,594, now Patent No. 3,421,438, dated Jan. 14, 1969. Divided and this application June 24, 1968, Ser. No. 753,329
Int. Cl. G06k *19/00, 21/00;* B42f *21/00*
U.S. Cl. 235—61.12 4 Claims

ABSTRACT OF THE DISCLOSURE

An optical coincidence card for indexing items of information germane to a selected primary value and comprising a base of clear, transparent plastic material having a coating and a grid of contrasting colors over-printed one upon the other only on one side of the clear base. The grid divides the coating into discrete, ordered spaces, and a numbering system printed on the card identifies the ordered spaces defined by the grid. At least at one of the ordered spaces, the base is free of the coating to expose the said base and thereby provide a clear light transmitting spot for identifying an item of information germane to the primary value by visual inspection. When a deck of such cards are stacked and aligned, the desired common items of information on the cards is observable by passage of light through the aligning clear spots.

RELATED APPLICATIONS

This application is a division of my co-pending application Ser. No. 668,594, filed on Sept. 18, 1967, for System, said application Ser. No. 668,594 being a continuation-in-part of my now abandoned application Ser. No. 389,372, filed Aug. 13, 1964.

This invention relates to information retrieval systems and, more specifically, to information retrieval systems of the optical coincidence type.

Optical coincidence information retrieval systems of the type to which the present invention relates provide a convenient method of ascertaining, by visual inspection, items of information germane to a particular primary value and items of information common and germane to a number of selected primary values. Such systems generally consist of a collection or deck of optical coincidence cards, each of which represents or is identified with a particular primary value.[1] The items of information to be classified are each assigned a unique, discrete, ordered card location which is the same for all cards in the deck. In the heretofore available systems of this type holes are punched in each card at the location or locations representing items of information germane to the primary value identified with each of the cards.

[1] There does not have to be a one-to-one correspondence between primary values and optical coincidence cards. Two or more cards may be identified with a primary value to extend the number of items a given system can accommodate or, in accord with the aspect of the present invention, each optical conicidence card can be assigned multiple primary values.

Items of information germane to a particular primary value are readily ascertainable by selecting the optical coincidence card or cards identified with the primary value and ascertaining the locations of the holes in the card (or cards). To assist in identifying the location of the holes, the information retrieval system is provided with a grid coordinate or other system by which each location is uniquely identified in coded form as a set of one or more characters (numbers are commonly employed but letters or other symbols can be employed, if desired). The location identifying systems are, in prior art systems, generally printed on a transparent overlay or directly on the cards or provided by coordinate crosshairs on a radiant device.

Information retrieval systems of this type are also provided with a key from which the identity of the items of information represented by each set of location identifying characters is ascertainable. Consequently, items of information germane to a given primary value are quickly ascertainable by selecting the appropriate optical coincidence card or cards, ascertaining the sets of characters identifying the hole or holes therein, and referring to the key for the identity of the item of information represented by each set of characters.

To identify items of information common to multiple primary values, the optical coincidence cards identified with the selected primary values are removed from the deck, stacked, and aligned. As each item of information has the same location on each card, the holes of the desired comon items of information will be aligned and easily identified by the passage of light therethrough. The locations of these holes are recorded in coded form and the identity of the desired items of information ascertained from the locator key.

Information retrieval systems of the type just described accommodate many different schemes of classification. Perhaps the most common is the classification of literature under the various terms of a subject index. In this classification scheme the optical coincidence cards are termed "subject-index" cards, and the cards are identified with index terms. The items of information are the documents to be classified so that a hole in an index card represents a document germane to the index term with which the card is identified. This classification scheme permits ready identification of all documents which are germane to a given subject and all documents germane to all of a number of subjects.

Such systems also accommodate other classification schemes. For example, they may be constructed to permit identification of authors whose works relate to a given subject and of all classified authors whose works relate to all of a number of subjects. Countless other possibilities for classifying useful information to facilitate its retrieval with minimum effort will readily occur to those skilled in the arts to which this invention pertains.

An optical coincidence type information retrieval systems can accommodoate various schemes of classification, the terms "primary value" and "item of information" are employed in this application to identify generically the headings with which the optical coincidence cards are identified and the several items which are classified under the various headings and each represented by a unique discrete ordered location common to all of the cards in a particular system.

The terms "primary value" and "item of information" are also intended to embrace sets of headings and of items with which the ordered card locations are identified as each primary value or item of information may be a set. For example, in classifying documents under subject headings, each card location may be made to represent a class or designated group of documents rather than a single document. Or, in the same type of classi,cation scheme, each primary value could be a set of subjects, to any one or two or more of which documents represented by a given location might relate.

The basic principles of optical coincidence information retrieval systems and the heretofore available systems employing these principles—all of which are of the punched or drilled aperture card type—are described in Chapter 6 of Punched Cards, Casey, Perry, Kont, and Barry (second edition), Reinhold Publishing Company, New York, N.Y. and in the literature listed in the bibliography at the end of Chapter 6.

Primary objects of the present invention are the provision of improved optical coincidence information retrieval systems of the type described above and of novel improved methods for manufacturing the optical coincidence cards employed in such sytems.

As discussed above, all of the heretofore available information retrieval systems of the type described above employ apertured or punched optical coincidence cards. The necessity of punching or drilling the cards has seriously limited the usefulness of optical coincidence systems as the punched or drilled cards are too expensive to produce in the quantities necessary for most applications. For example, the expense of constructing a subject index running to hundreds of terms and then classifying perhaps many thousand documents under the index terms is often justified only if the classified information is useful to and can be made available to a large number of interested persons. This requires, as far as optical coincidence systems are concerned, that each of a particular deck of optical coincidence cards must be duplicated in numbers which may well run into the thousands. As there may be an equally large number of cards in the deck, the number of cards required in a given instance cannot normally be produced at an economically practicable price.

I have now discovered a novel method of easily and inexpensively producing duplicate decks of optical coincidence cards in any desired number. In my novel method, a master of each card is first prepared by conventional punching or drilling techniques or by drawing or pasting up a facsimile of each card in which case areas or spots which are photographically contrastable with the background of the facsimile may be employed instead of holes. A master printing plate is then prepared for each card by any conventional photoreproduction process. The master plates are utilized to print the desired number of duplicates of each master card in an offset or other printing press.

Preferably the cards are of light transmitting (translucent or transparent) material; and an opaque background is printed on each card. Consequently, the printed cards will be free of ink and the transparent or translucent base exposed in areas identical in location, configuration, and size to the photographically contrasting holes or areas of the master cards.

The clear areas of my novel optical coincidence cards serve the same purpose as the holes in the conventional cards. Such areas are readily distinguishable from the opaque backgrounds of the cards making the locations of items of information germane to a selected primary value readily discernible by visual inspection of the appropriate card or cards. Locations representing items of information germane to all of a number of selected primary values can also be readily ascertained by stacking and aligning the appropriate cards. In those locations where ink free areas on all of the cards are aligned, light will pass through the stack of cards making these locations (which represent the desired items of information) readily apparent.

Although relatively expensive plastic or other light transmitting material is used as the printing stock, this does not increase the cost of my novel optical coincidence cards relative to those produced by conventional card punching techniques. For instance, in the prior art systems in which the apertures are produced by drilling, the cards must be made of special stable heat resistant materials. If they are not, but are made of paper or thermoplastic materials, the heat generated by the drills as they pass through a stack of cards will result in the distortion of the material and inaccurately sized and located holes in the lower cards in the stack. And in punched card systems, as pointed out in Punched Cards, to provide durability, dimensional stability, and other necessary characteristics, a material such as vinylite plastic must be used for the punched type optical coincidence cards so that the card materials I employ are no more expensive than those used in prior art systems.

In addition to those discussed above, my novel optical coincidence cards and information retrieval systems in which they are incorporated have a number of additional important advantages over the heretofore known punched card systems. One of these is that there can be conveniently and economically printed directly on the cards in the manufacturing process a grid for dividing the surface of the card into discrete ordered spaces in which the ink free exposed areas of the base are located and a numbering or other system for uniquely identifying each of the ordered spaces. In accord with the present invention the grid and symbols of the grid identifying system are preferably printed in a color contrasting with the background to make them clearly visible.

In another aspect my invention resides in printing the backgrounds of the novel optical coincidence cards described above in multiple colors. This is of material importance as the multiple colors can be used as a locator code to substantially increase the speed with which a search may be made in an optical coincidence information retrieval system.

Another novel and important feature of the present invention is the use of ink free spots or areas of different configurations on the optical coincidence cards. In the heretofore available optical coincidence systems information is conveyed only by the location of the holes, and the shape of the holes has no significance. I have now discovered that additional information can be conveyed by the shape as well as the location of the holes. Consequently, the use of ink free spots of different shapes increases the capacity of given size optical coincidence cards and systems and, conversely, permits a reduction in the size of an optical coincidence card or system of given capacity.

A further novel and important aspect of my invention resides in printing the location identifying indicia in the ink free spots or areas on the optical coincidence cards or on a transparent overlay. This facilitates identification of the clear spots and eliminates the errors in identifying the spots which may occur when a numbering or other location identifying system must be referred to to identify the spots and eliminates the necessity of printing grid and numbering or other location identifying systems on the cards. This feature is particularly helpful when a number of optical coincidence cards are stacked to identify items of information which are common to all of multiple primary values. With the cards stacked, all numbers except those identifying clear spots and locations common to all of the cards (and possibly the numbers on the top card) are blocked out, which virtually eliminates errors in ascertaining the desired common items of information.

It will be apparent that, if the various ordered locations are identified by numbers and the numbers are printed inside the clear spots, clear spots of varying size are necessary to accommodate different numbers. For example, the numerals 1–9 can be printed in a relatively small spot while, if the numeral is in the housands, a much longer spot will be required. In accord with my novel method of printing optical concidence cards, the size and spacing of the clear spots can be varied as desired without increasing the complexity of the manufacturing process. This is in direct contrast to the prior art systems employing drilling and punching techniques. The apertures in the cards of these systems are produced by geometrically ordered machinery which are capable of producing apertures only in evenly spaced symmetrical rows and are not capable of producing an asymmetrical arrangement of information representing locations as is the method of the present invention which is, therefore, substantially more flexible than the prior art techniques.

In conjunction with the foregoing, another important feature of my invention is that the asymmetrical capabilities of my novel optical coincidence cards facilitate the use of identifying indicia other than numbers such as letters and other symbols, designs, or other identifying indicia, which can be made either in the same color as or in a contrasting color to the background.

Another important advantage also follows from the use of identifying indicia printed in the clear spots. This is that, by using indicia printed in the clear spots and clear spots of different configurations, the configurations as well as the locations of the clear spots can be employed to convey information, materially increasing the capacity of my novel optical coincidence cards.

From the foregoing, it will be apparent that further objects of the present invention include:

(1) The provision of novel optical coincidence cards which can be duplicated much more cheaply than those employed in heretofore available optical coincidence systems;

(2) The provision of novel, improved optical coincidence cards which make it practicable to print a grid system dividing the card into discrete ordered spaces and a system for uniquely identifying each of the ordered spaces directly on the cards;

(3) The provision of optical coincidence cards and information retrieval systems which have a greater capacity than heretofore available cards and systems of equal size;

(4) In conjunction with the preceding object, the provision of novel optical coincidence cards with information indexing areas of different configurations to increase the capacity of the cards;

(5) The provision of novel information retrieval systems employing optical coincidence cards of multiple colors to increase the case with which a particular card or group of cards may be located;

(6) The provision of novel optical coincidence type information retrieval systems which have greater flexibility than those heretofore known in that the information identifying location may be asymmetrically ordered; and (7) The provision of novel optical coincidence type information retrieval systems in which grid and numbering or other location identifying systems are not necessary.

Another specific object of the present invention is the provision of novel optical coincidence cards consisting of a base of light transmitting material with an opaque background printed on it except in those locations identified with items of information germane to the primary value or values represented by a card.

In conjunction with the preceding object, another object of the present invention resides in the provision of novel optical coincidence cards in which the location identifying indicia are printed in the background free areas identified with items of information germane to the primary value or values represented by a card.

Yet another specific object of the present invention resides in the provision of novel methods for producing optical coincidence cards as described in the preceding objects.

Other objects, additional advantages, and further novel features of the present invention will become fully apparent from the appended claims and as the ensuing detailed description and discussion proceeds in conjunction with the accompanying drawing, in which:

Figure 1:
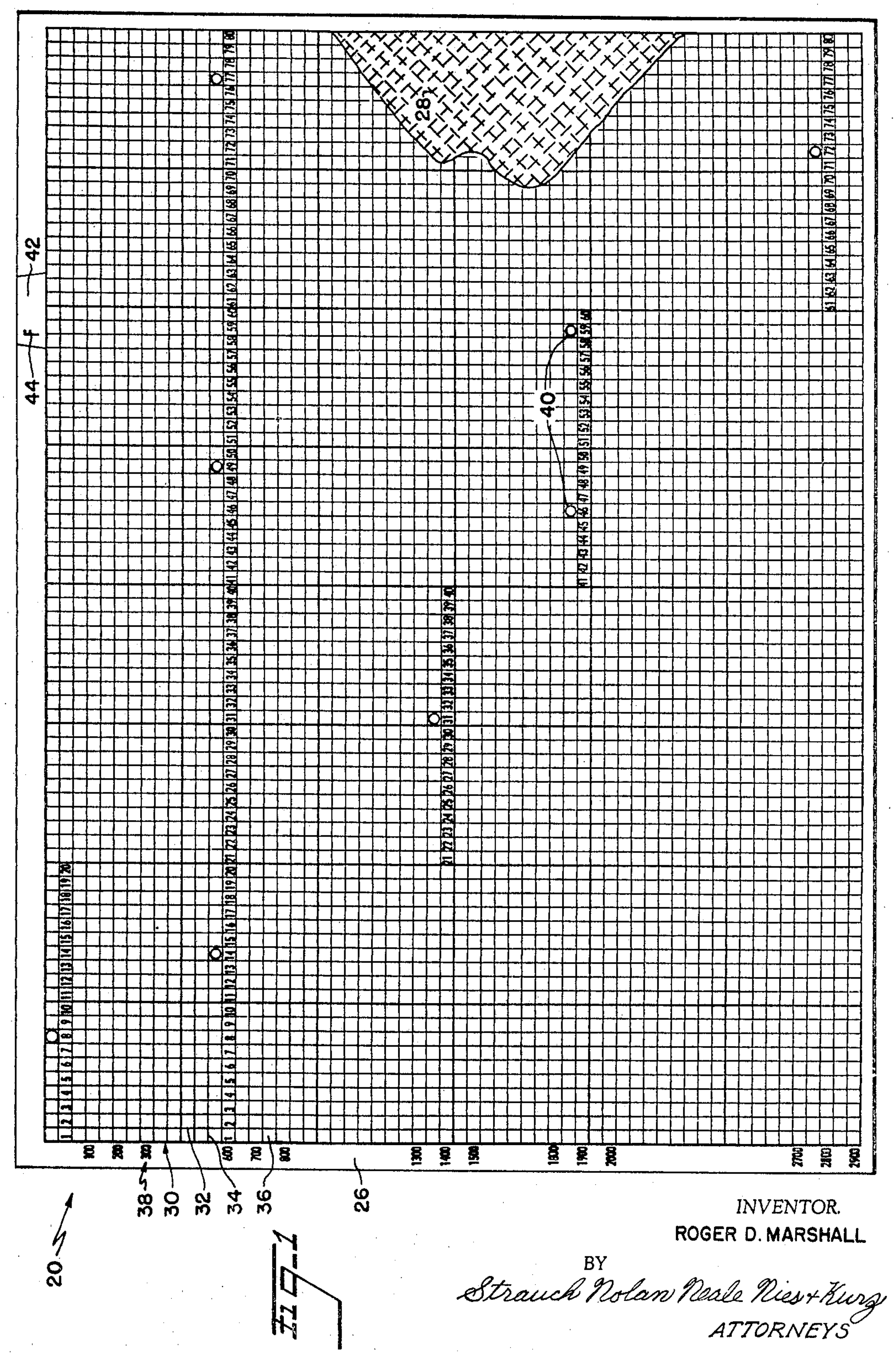
FIGURE 1 is a plan view of an optical coincidence card which together with other like cards and one or more keys constitutes an optical coincidence information retrieval system.
Figure 11:
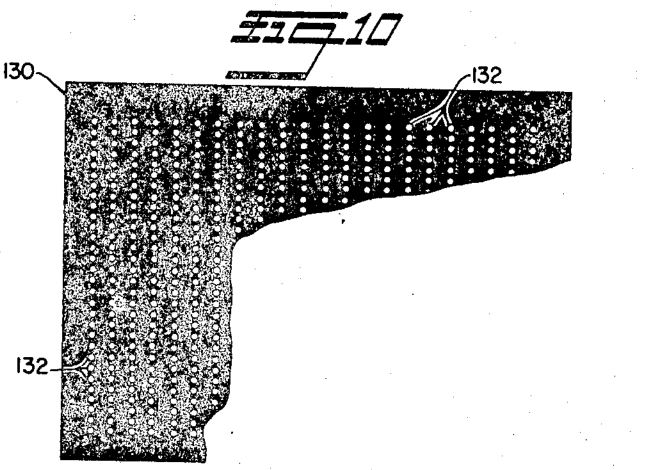
FIGURE 11 is a plan view of a master optical coincidence card which is used in the production of a set of coincidence cards according to another novel aspect of this invention.
Figure 12:
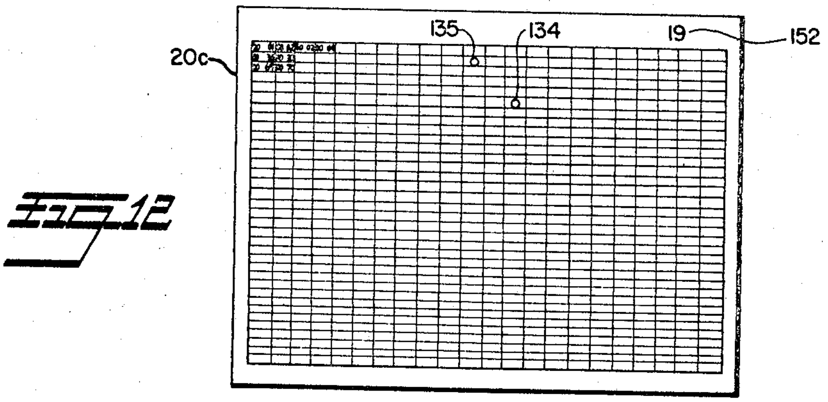
Figure 13:
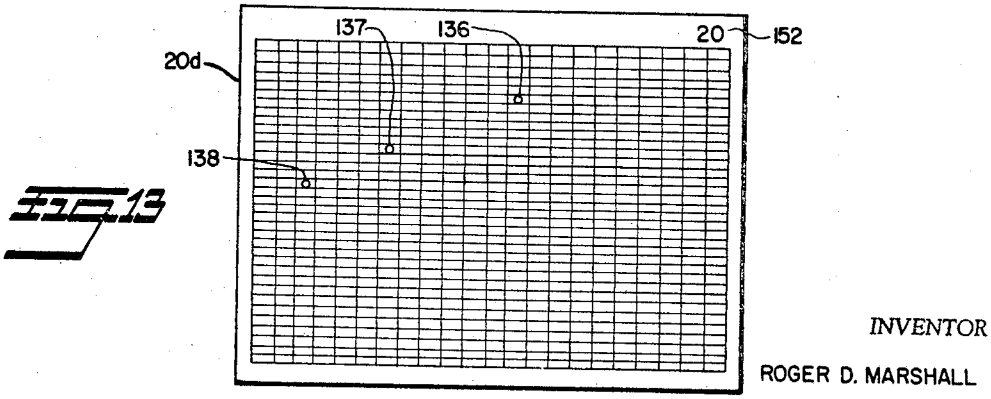
Figures 14, 15, 16:
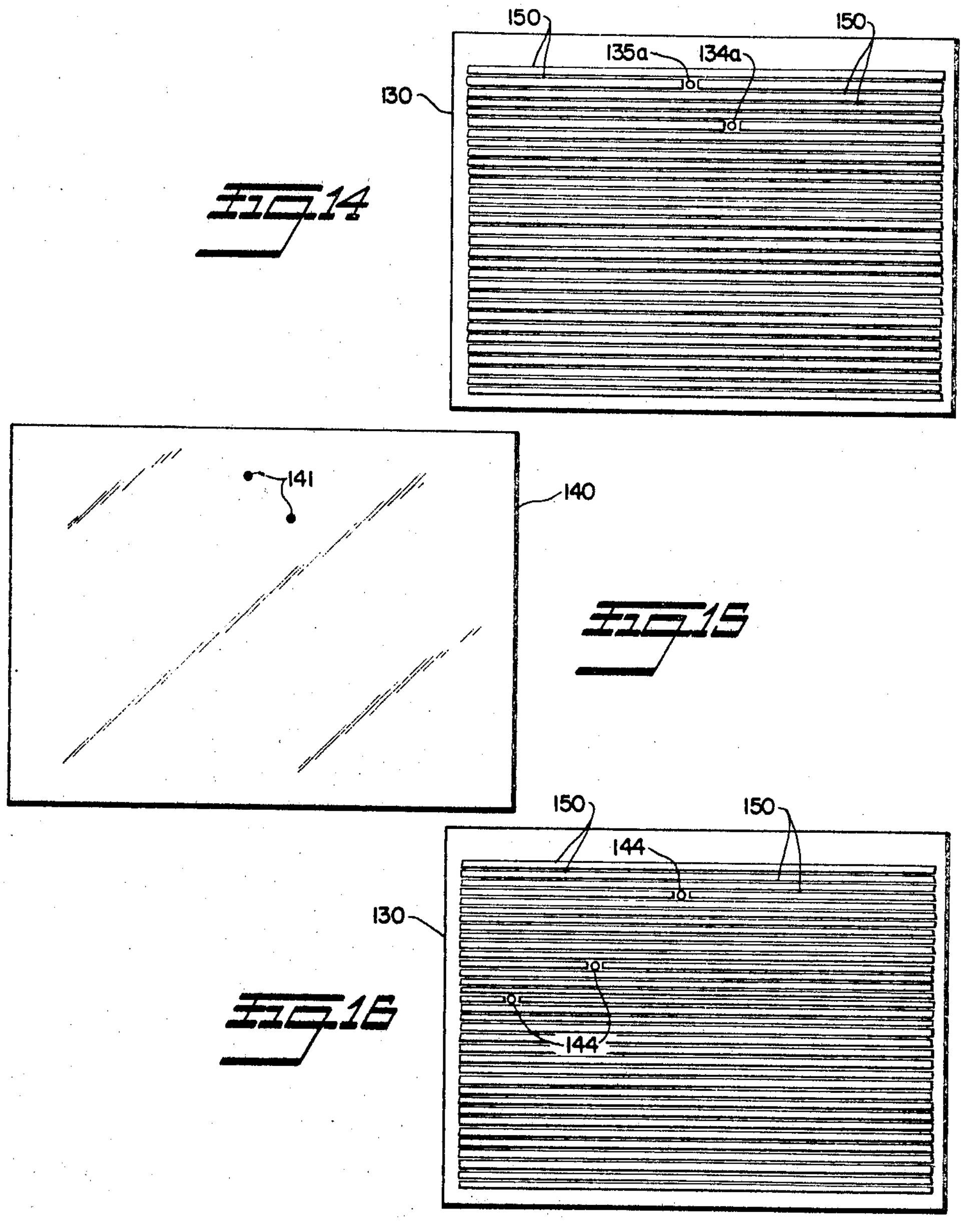

FIGURES 12 and 13 respectively are plan views of optical coincidence cards which are similar to that shown in FIGURE 1, but which have different arrangements of the clear or ink-free spots;

FIGURE 14 is a plan view of the master card which is shown in FIGURE 11, but which is masked to illustrate an intermediate step in the method for producing the coincidence card of FIGURE 12;

FIGURE 15 illustrates a plan view of a photocopy of the masked master card shown in FIGURE 14; and FIGURE 16 is a plan view of the master card which is shown in FIGURE 11, but which is masked to illustrate an intermediate step in the method for making the coincidence card shown in FIGURE 13.

Referring now to the drawings, FIGURE 1 depicts an optical coincidence card 20 constructed according to the principles of the present invention. A plurality of optical cards 20 together with associated keys such as the subject heading key 22 illustrated in FIGURE 3 and a key 24 (see FIGURE 4) for identifying the items of information indexed on cards 20 constitute an information retrieval system of the optical coincidence type.

The optical coincidence card 20 illustrated in FIGURE 1 includes a base 26 of light transmitting material overprinted with a colored ink to provide an opaque background 28 (see FIGURE 2) on the surface of the base. Background 28 is overprinted, in a contrasting color, with a grid 30 consisting of equidistantly spaced apart vertical lines 32 and horizontal lines 34 which divide the surface of base 26 into discrete, ordered, square spaces 36. Also printed on card 20 in a color contrasting with background 28 is a numbering system identified generally by reference character 38 by which each of the ordered spaces 36 is uniquely identified. Items of information which are germane to the primary value or values with which card 20 is identified are represented on the card by small circular areas or spots 40 in spaces 36 which are free of the ink providing background 28 and in which the light transmitting base 26 is, therefore, exposed.

Optical coincidence card 20 is also provided with a colored tab 42 (which may be of the same color as the background color) on which a primary value, with which a particular card is identified, is uniquely identified in coded form by a set of characters including one or more symbols 44.

Base 26 may be of any desired transparent or translucent material although the selected material should be dimensionally stable and durable. A number of plastics are suitable for this pupose. Typical ones are vinyl, triacetate, and Mylar.

One suitable numbering system, illustrated in FIGURE 1 (only a few of the numbers are shown), consists of the numerals 1 through 80 extending laterally across the card in every tenth row and the numbers 100 through 2900 opposite alternate horizontal rows of the ordered spaces 36. Spots 40 are located in horizontal rows above those in which the identifying numbers are printed so that they, at no time, fall in the rows in which the numerals are printed. It will be apparent, from FIGURE 1, that the foregoing numbering system uniquely identifies each of the ordered spaces 36 (the five spots 40 shown are, for example, numbers 8, 614, 649, 1431, 1946, 1959, and 2072) in coded form as a set of one to four numbers.

Other numbering systems or systems employing symbols other than numbers may be substituted for the illustrated system if desired, it only being necessary that the selected system uniquely identify each of the ordered spaces 36.

As mentioned above, spots 40 are in locations representing items of information germane to the primary value or values with which a particular card 20 is identified. Therefore, the items of information germane to a selected primary value can be readily identified by selecting the appropriate card 20 and ascertaining, by visual inspection, the locations of the spots 40 on the particular card and the set of numbers or other symbols which identifies the location of each of the spots in coded form. The identity of each item of information is then ascertained from key 24 which may simply consist of two columns 48 and 50, the acts of characters identifying spaces 36 being listed in column 48 and the items of information represented by the several sets of characters being opposite the associated sets of characters in column 50.

Key 22 is provided to facilitate the selection of the appropriate optical coincidence card 20. This key may simply consist of two columns 52 and 54, the primary values being listed in column 52 and the sets of characters 44 by which the primary values are represented on optical coincidence card 20 being set out opposite the primary values in column 54. To select the appropriate card 20, the primary value under consideration is located in column 52 and the set of characters 44 set out opposite it identified. The card or cards 20 bearing this set of characters is then selected from the deck of cards.

Information retrieval systems of the optical coincidence type are also extremely and perhaps most useful for identifying items of information which are common to a number of selected primary values.

Figure 2:
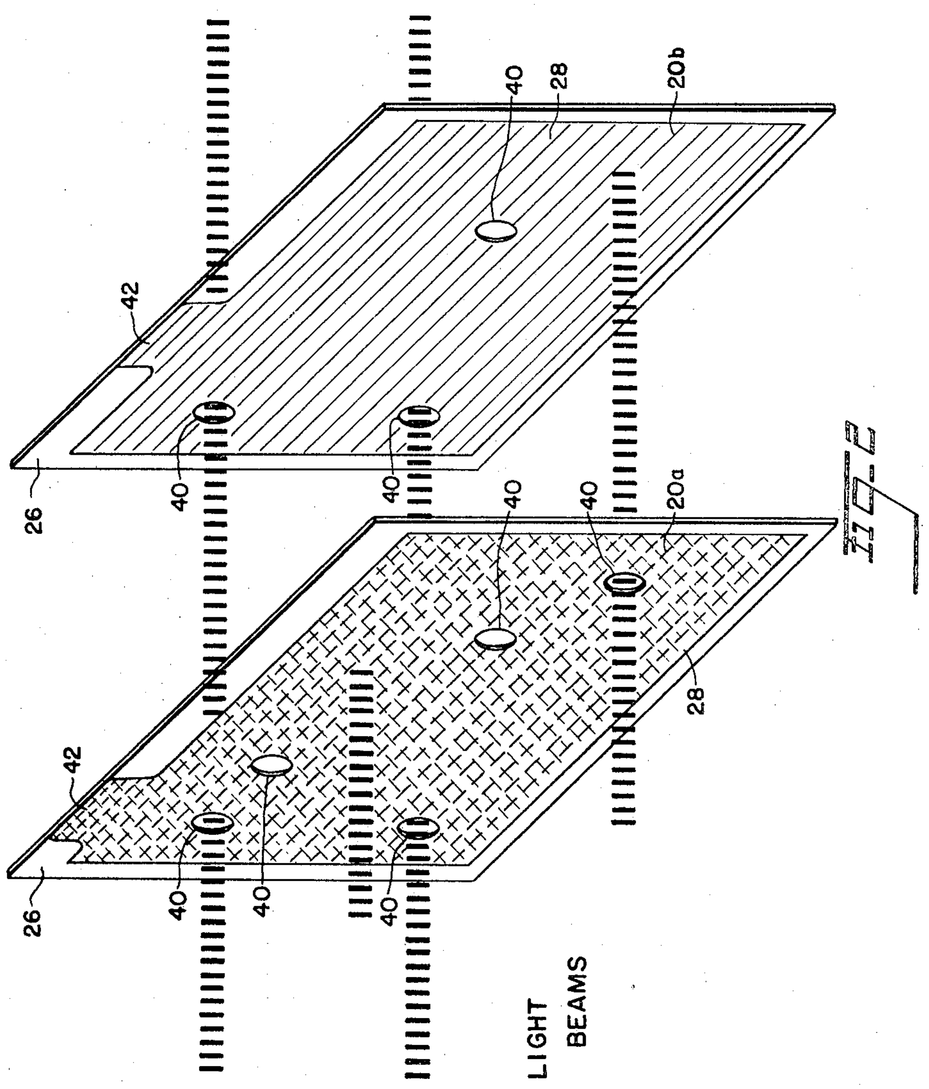
FIGURE 2 is a pictorial view illustrating the manner in which the optical coincidence cards of FIGURE 1 are employed to identify items of information germane to a number of selected primary values.

Referring now to FIGURE 2, this is done by identifying the optical coincidence cards 20 with which the selected primary values are associated in the manner described above and removing them from the deck of optical coincidence cards. These cards are stacked and aligned; and, as shown in FIGURE 2, light beams pass through the aligned cards 20 in those locations where spots 40 are aligned. Such locations represent items of information common to the selected primary values since, as explained above, each item of information is assigned a location which is the same for each card 20 in the deck. The sets of characters identifying the location through which the light beams pass are then ascertained and the items of information represented by these sets of characters identified from key 24 in the manner described above.

Figure 3:
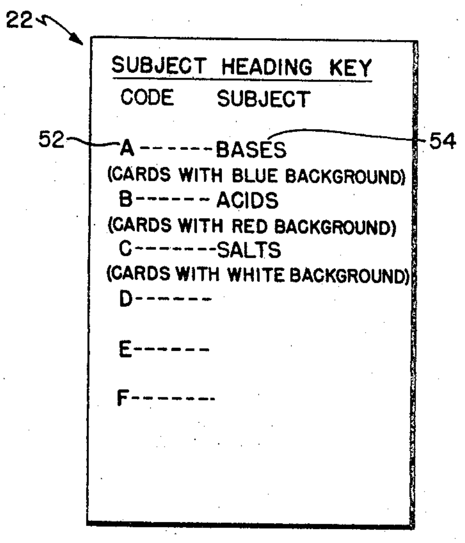
FIGURE 3 is a pictorial representation of a key from which the identity of primary values represented in coded form on the optical coincidence cards of FIGURE 2 are ascertainable.
Figure 4:
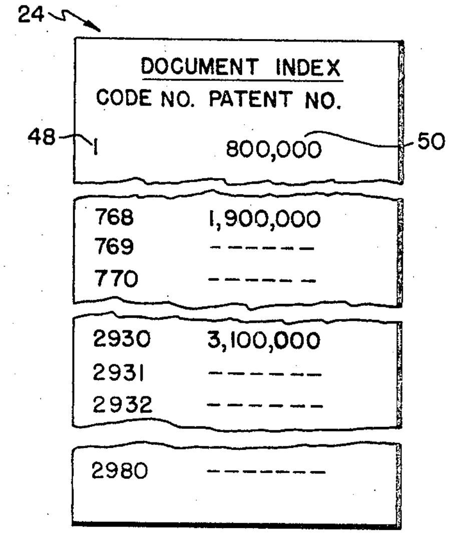
FIGURE 4 is a pictorial representation of a key from which the identity of items of information represented on the optical coincidence card of FIGURE 1 by clear areas or spots is ascertainable.

As discussed previously, information retrieval systems of the type just described accommodate many schemes of classification. One of these, as also mentionad previously, is that in which the primary values with which the optical coincidence cards 20 are identified are the index terms of a subject index and the items of information identified by the ordered locations or spaces 36 on the cards are documents classified under the index terms. For example, as shown in FIGURES 3 and 4, an information retrieval system of the type to which this invention relates may be employed to classify patents on chemical compounds.

Thus, different ones of the optical coincidence cards 20 may represent, for example, acids, bases, salts, etc. and spaces 36 may identify the patents to be classified (in this example the index, texan acids, bases, and salts are the primary values and the patents the items of information). In this system, by following the procedures outlined above, all of the classified patents which relate to bases, for example, may be readily identified by selecting the optical coincidence card 20 identified with bases, ascertaining the location of the spots 40 on the card and the sets of characters 44 by which such bases are identified, and then turning to key 24 to identify the patents represented by these sets of characters. Similarly, those patents which deal with both acids and bases can be readily identified by removing from the deck of cards 20 those cards identified with acids and bases, aligning the cards, identifying by their unique sets of characters 44 those locations where light passes through the aligned cards, and turning to key 24 to identify the patents represented by the previously ascertained sets of characters.

One of the novel and most important features of the present invention is the method by which the optical coincidence cards 20 of the information retrieval system just described are prepared. The first step in producing each of the optical coincidence cards 20 of a particular collection or system in the preparation of a master card. The master card may be prepared in any one of several ways. For example, the master card may be made by employing the card punching or drilling techniques employed to make conventional optical coincidence cards. This technique is explained in detail in the text punched cards, referred to above, and it is, therefore, not believed necessary to describe this technique in detail herein, especially as such details are not part of the present invention.

The master cards may also be prepared by conventional artwork techniques, e.g., by drawing the spots 40, grid system 30, and numbering system 38 on the master card or the master card may be prepared by conventional "paste-up" techniques. Regardless of the technique, the resulting master card will contain the grid and numbering systems and holes or spots which contrast with the background of the master card.

Photographic master plates are then made from the master cards by conventional photoreproduction techniques. Again, the particular techniques employed are conventional and are not part of the present invention so it is not believed necessary to describe them herein. One manner in which photographic master plates may be produced is described in detail in J. E. Cogoli, Photo Offset Fundamentals, McKnight and McKnight Publishing Co., 1960, for example; and reference may be had to this work if deemed necessary for a more complete understanding of the present invention.

The photographic masters are employed to print background 28, grid system 30, numbering system 38, and the sets of characters 44 identifying the primary values on bases 26. An offset press is suitable for the printing process; but other presses may be used, if desired.

When the cards 20 are printed, ink is not deposited in the areas on the printed cards corresponding in location to the holes through or contrasting spots on the master card. Therefore, the printed cards will, as described above, have an opaque solid background 28 covering their surface except in the areas 40 corresponding to those items of information germane to the particular primary value or values with which a particular card being prepared is identified.

After background 28 is printed, it is overprinted with grid system 30 and numbering system 38 in a contrasting color. Many modern printing presses are especially designed to print multiple colors at succeeding stations and are so constructed that precise registration of the colors is provided. Consequently, while optical coincidence cards 20 prepared in the manner just described must have accurate registration of spots 40 and the lines 32 and 34 of grid system 30, this may be readily accomplished in modern printing presses.

One important advantage of the novel method of producing optical coincidence cards just described is that the cards may be prepared in large numbers at low cost in contrast to the heretofore employed punching or drilling techniques which made the duplication of systems quite expensive. Another important advantage of the optical coincidence card producing technique just described over the heretofore known punching and drilling techniques is that, by using this method, a locator code by which particular cards 20 can be easily identified can be readily incorporated in an optical coincidence type information retrieval system.

One manner in which this may be done is by employing backgrounds 28 of different colors. For example in the exemplary scheme of classifiying patents for chemical compounds discussed in column 9 line 50, a blue background may be used on all optical coincidence cards identified with bases and red backgrounds on all cards identified with acids, etc. This permits a searcher interested only in bases, for example, to materially reduce his search since all of the relevant patents wil be indexed on blue cards; and no relevant patents will be indexed on cards having backgrounds of other colors (it is assumed, for the purposes of the foregoing illustration, that none of the patents classified is germane to more than one primary value).

As a further example, it may be desired to classify more than one type of literature under the various index terms of a subject index. Continuing with the typical scheme of classification discussed above, it may be desired to classify both patents and chemical abstracts under index terms such as bases, acids, and salts. By employing, for each of these index terms, cards of two different colors such as the orange and blue cards **20*a* and 20*b*** illustrated in FIGURE 2, the searcher can immediately ascertain whether a given document germane to the subject in which he is interested is a patent or a chemical abstract. Thus, he can make a much more rapid search if he is interested only in a particular type of literature since he need only concern himself with cards of one particular color.

Or, as another example, the blue card might be employed to index documents dated prior to 1950 and the orange card those dated later than 1950. Therefore, if the searcher were only interested in literature dated later than 1950, he could eliminate all blue cards identified with the primary values in which he was interested, materially decreasing the scope of and speeding up his search.

Another important advantage of the card manufacturing technique just described is that, by using this technique, the capacities of optical coincidence cards of a given size (and, therefore, the systems constituted by such cards) can be materially increased over those heretofore known; and, conversely, the size of optical coincidence cards and information retrieval systems can be materially decreased by employing the novel methods described herein. Specifically, in contrast to the heretofore known punching and drilling techniques, which produce only holes of one configuration, clear spots of different configuration may be provided as easily as those of a single shape by preparing the master card by the artwork or paste-up technique mentioned above. The different configurations can be utilized to convey information with which either the primary values or the items of information indexed on the cards can be further identified.

Figure 5:
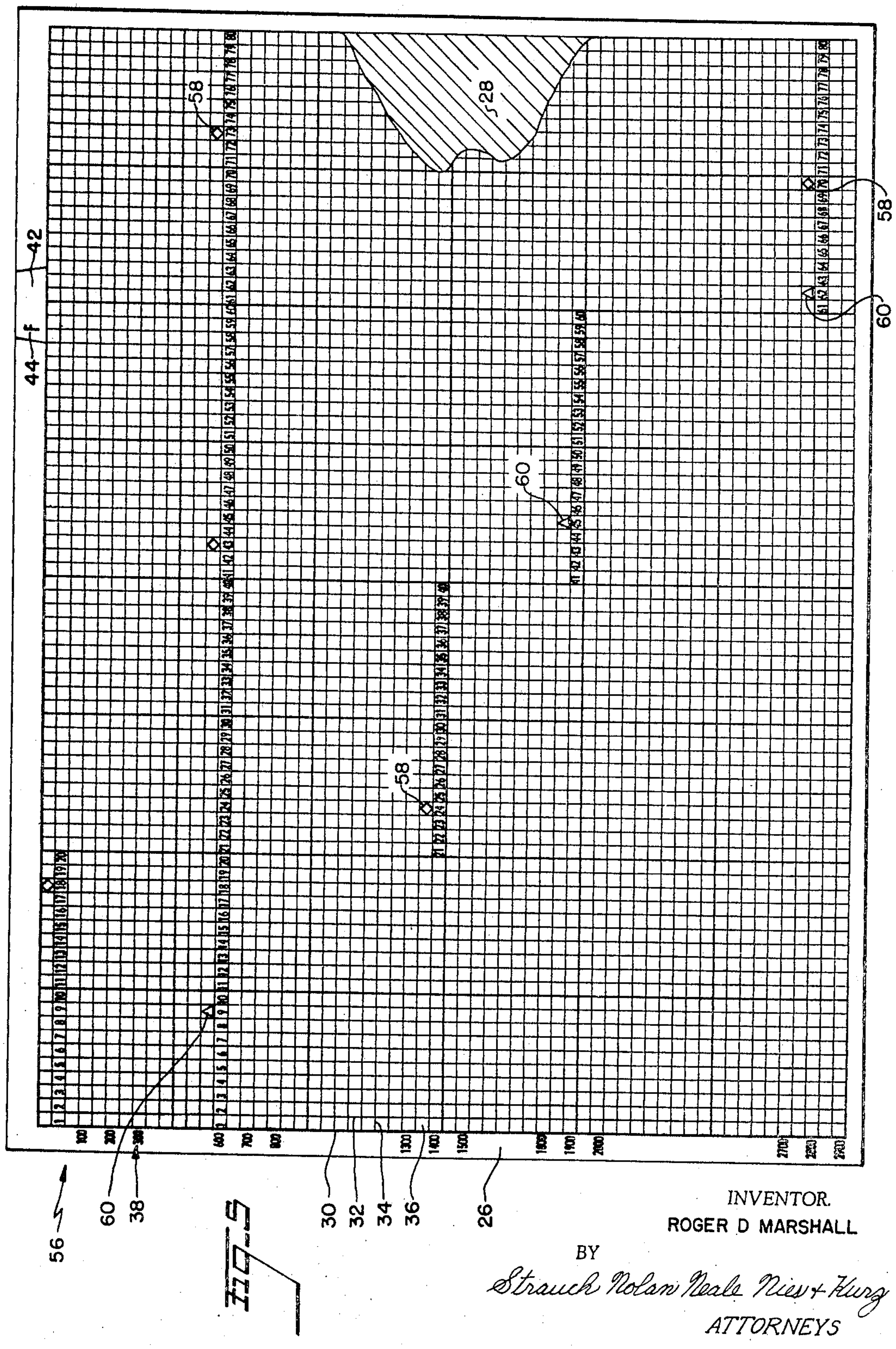
FIGURE 5 is a plan view of an optical coincidence card similar to that illustrated in FIGURE 1, but employing clear areas or spots of different configurations to increase the capacity of the card.

For example, continuing with the exemplary literature classification scheme discussed above, it may, as mentioned previously, be desired to classify various types of chemical literature such as patents and chemical abstracts under the subject headings bases, acids, and salts. On the optical coincidence card 56 depicted in FIGURE 5 (which, except for the configurations of the clear spots, is identical to the card 20 of FIGURE 1), the diamond shaped clear spots 58 may represent patents and the triangularly configured clear spots 60 chemical abstracts. Therefore, from the configuartion of the clear spots on a particular card 56 alone, the searcher can immediately ascertain whether a given clear spot represents a patent or chemical abstract. This speeds the search if, for example, he is only looking for patents and is not interested in chemical abstracts as it is not necessary to refer to document index 24 to ascertain this information.

In addition to being employed to further identify items of information, clear spots of multiple configurations may also be employed to further identify primary values. For example, in the subject heading key of FIGURE 3, it may be desired to break the subject heading "bases" down, for example, into subheadings such as: bases having one hydroxyl group, bases having two hydroxyl groups, and bases having three hydroxyl groups. Instead of employing a separate card for each of these separate subheadings (which would then become primary values) and thereby greatly increasing the number of cards and the time required for the search, the same result may be obtained by employing spots of one configuration for the first of these subheadings, spots of a second configuration for the second subheading, spots of a third configuration for the third subheading, spots of a fourth configuration to represent patents which disclose bases with both one or two hydroxyl groups, etc., so that all possible combinations of different numbered hydroxyl groups may be ascertained by spots of seven different configurations instead of employing seven different cards as has heretofore been necessary.

Figure 6:
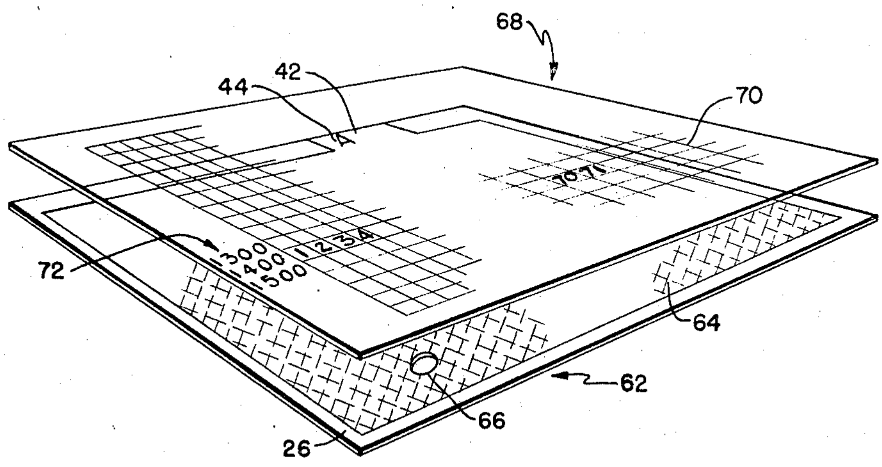
FIGURE 6 is a pictorial representation of an optical coincidence card similar to that shown in FIGURE 1 and of a transparency overprinted with a grid and scale for identifying the ordered locations of the clear areas or spots on the card.

Although, in the optical coincidence card embodiments described above, grid system 30 and the system 38 by which each individual ordered space provided by the grid system is uniquely identified are printed directly on the optical coincidence card, this arrangement is by no means critical, but is merely one of convenience. Thus, FIGURE 6 diagrammatically depicts an optical coincidence card 62, which is identical to the optical coincidence card 20 described above except that the only printing on the card is the colored background 64 in which there are clear spots 66 in locations assigned to the various items of information to be classified. An optical coincidence information retrieval system employing cards of the type illustrated in FIGURE 6 includes, in accordance with the principles of the present invention and in addition to the components discussed above, a transparency 60 on which a grid 70 and a location identifying system 72 (which may be identical to the corresponding grid and numbering systems 30 and 38 of the embodiment of FIGURE 1) are printed.

Optical coincidence cards 62 are utilized to ascertain items of information germane to one or a number of primary values in the manner described above in conjunction with the embodiment of FIGURE 1 except that transparency 68 is placed over the optical coincidence card or cards selected from the collection constituting the particular system. The clear spots 66 will readily show up on the transparency because of the colored background 64 of the card; and, therefore, the locations of these spots may be readily identified, permitting the desired items of information to be ascertained from key 24 in the manner described above.

Figure 7:
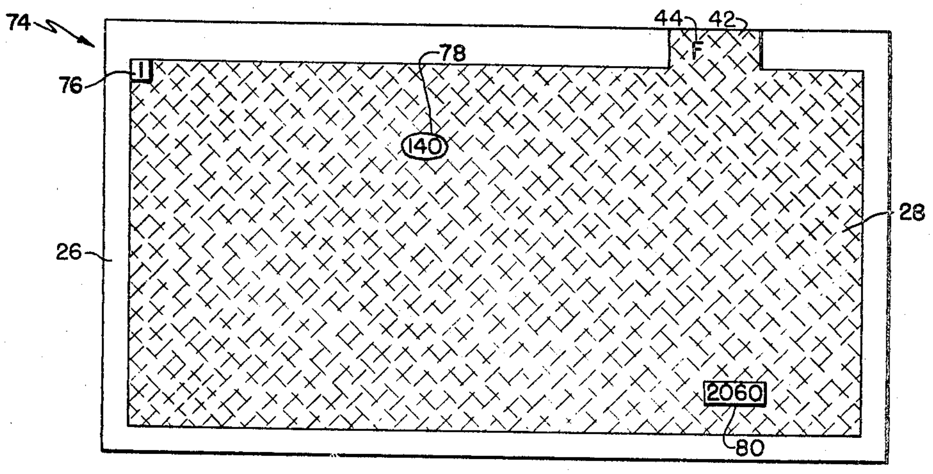
FIGURE 7 is a plan view of an optical coincidence card in accord with the principles of the present invention in which the location identifying indicia are printed directly in the clear spots.

FIGURE 7 illustrates another important embodiment of my invention. The novel optical coincidence card 74 illustrated in this figure differs from those illustrated previously in that the symbols (numerals "1," "140," and "2060" in the illustrated embodiment) by which the items of information germane to the primary value or values with which card 74 is identified, are printed directly in the clear spots 76, 78, and 80 at the locations representing these items of information; and the clear spots 76, 78, and 80 are of different size. This arrangement is of substantial importance for several reasons. First, the need for the grid system and numbering system employed in the embodiment of FIGURE 1, for example, is completely eliminated since each clear spot is identified by a unique set of symbols. Perhaps more important, however, the arrangement shown in FIGURE 7 both speeds the search process and reduces the possibility of error since there is no need to refer to a numbering system spaced apart from the clear spots to ascertain the identifying symbols as in the embodiments previously described.

These advantages are of even more importance when cards 74 are used in the manner previously described to ascertain those items of information common to multiple primary values. For example, assume that clear spot 80, in which numeral "2060" is printed, represents a document germane to several subjects; and clear spots 76 and 78 represent items which relate only to the particular illustrated cards 74. The cards representing the selected primary values are stacked and aligned; and light is transmitted through the space 80 in all of the cards 74, identifying document 2060 as one which relates to all of the selected primary values. All other clear spots in other than the top card will be blocked out so that there will be no chance of mistakenly recording a number identified with one of those spots. Moreover, the numerals "1" and "140" may be printed in the same color as background 28 so that they will also be virtually invisible and will not be mistakenly recorded. Or they may be printed in a contrasting color, in which case there will still be such a distinct difference in appearance between those numbers and the numbers in the aligned clear spaces 80 that the chances of making a mistake will be materially reduced.

Figure 8:
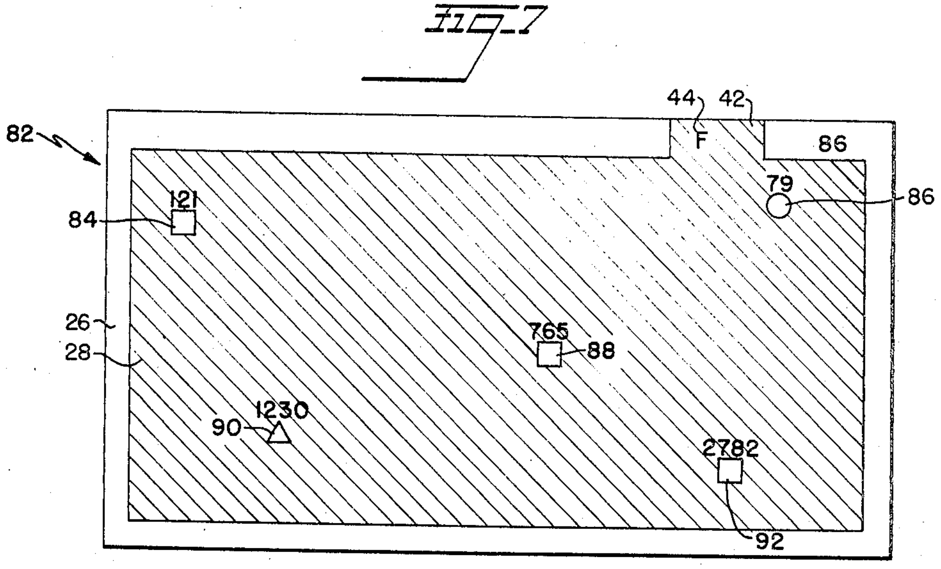
FIGURE 8 is a view similar to FIGURE 7 of an optical coincidence card in accord with the principles of the present invention in which the indicia identifying ordered locations on the card are printed adjacent the clear spots at such locations.

Referring now to FIGURE 8, it is not essential to obtain many of the advantages just described, that the identifying symbols be printed in the clear spots. As shown in the latter figure, which illustrates an optical coincidence car 82 constructed in accord with the principles of the present invention, the identifying indicia can be printed adjacent the clear spots 84, 86, 88, 90, and 92 to provide the advantages described above in conjunction with FIGURE 7.

As is shown in both FIGURES 7 and 8, arrangements as just described can also employ clear spots of different configuration (for example, spot 78 of FIGURE 7 is elliptical and, in FIGURE 8, spot 86 is circular, spots 84, 88, and 92 are square, and spot 90 is triangular). As described previously, the use of differently shaped clear spots increases the capacity of my novel optical coincidence cards as the configuration as well as the location of the spots may be used to convey information.

Figure 9:
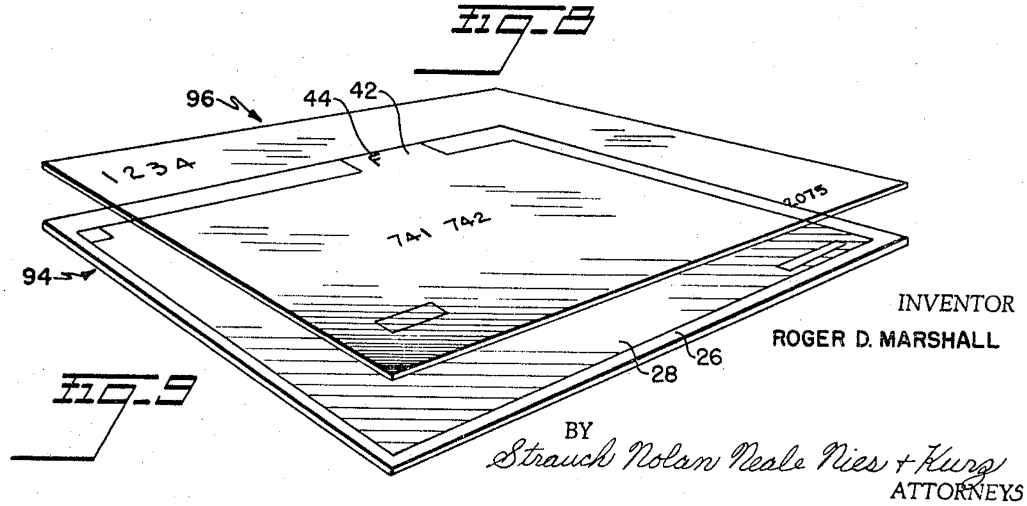
FIGURE 9 is a view similar to FIGURE 6 of an embodiment of the present invention utilizing optical coincidence cards similar to those of FIGURES 7 and 8 but employing a transparency on which the location identifying indicia are printed.

Referring now to FIGURE 9, it is not necessary that the numbers be printed on the card itself in arrangements of the type just described. As in the embodiment of FIGURE 6, they may be printed on a transparent overlay. FIGURE 9, for example, illustrates an optical coincidence type information retrieval system which employs optical coincidence cards 94 of the type shown in FIGURES 7 and 8 except that the numbers are not printed on the card, and a transparent overlay 96, on which the identifying numbers or other symbols are printed. This system is used in the manner described above in conjunction with FIGURE 6.

In conjunction with the embodiments of FIGURES 7, 8, and 9, the present invention provides a degree of flexibility which is not obtainable by the prior art punching or drilling techniques. Specifically, asymmetrical arrangements using clear spots of various shapes and configurations can be as readily and easily provided as those of a single configuration by employing the artwork or paste-up techniques described above. In the prior art punching and drilling techniques, in contrast, the aperture cards are produced by geometrically ordered machinery which drill or punch the apertures in evenly spaced symmetrical rows and produce apertures of equal size unless the machinery is taken down and set up to produce a different size aperture and is incapable, as a practical matter, of producing asymmetrically ordered arrangements.

Other physical embodiments and applications of the novel inventive concepts and principles disclosed herein will readily occur to those skilled in the art to which this invention pertains. Such variations of the disclosed embodiments, except as specifically excluded by the appended claims, are fully intended to be covered therein.

In the optical coincidence information retrieval systems described herein, precise registration is of particular importance for identifying items of information germane to a particular primary value as well as items of information common and germane to a number of selected primary values. The former factor deals with the registration of contrasting colors printed on each card to respectively provide the background containing the clear or ink-free spots and the information media by which the clear spots are uniquely identified. The latter factor deals with the accurate registration or alignment of clear spots formed in the backgrounds of separate cards and representing items of information which are common and germane to a number of selected primary values.

Figure 10:
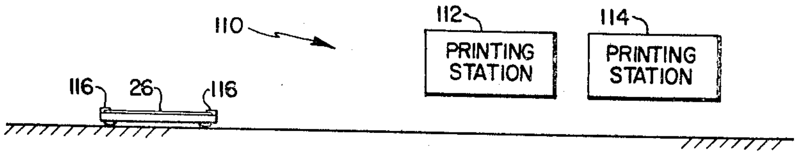
FIGURE 10 is a schematic illustration of an offset printing press as used in printing optical coincidence cards according to a novel method of this invention.

According to this invention, accurate registration of contrasting colors on each card is obtained by employing a conventional offset printing press 110 or the like which, as shown in FIGURE 10, is provided with spaced printing stations 112 and 114. Preparatory to a printing operation, the unshown printing plates at stations 112 and 114 are adjusted so that they are properly oriented with respect to each other. Base 26, upon which the contrasting colors are to be printed, is properly oriented relative to the printing plates at stations 112 and 114 and is securely clamped in its oriented position by press grippers 116. Then, in accordance with this invention, the clamped base is advanced successively through stations 112 and 114 without releasing grippers 116 and without otherwise altering the adjusted orientation of the base relative to the printing stations. Since base 26 never leaves grippers 116 as it passes through stations 112 and 114, the registration of the contrasting colors, which will be overprinted one upon the other, will accurately be maintained.

Station 112 may be utilized to print the background 28 on the surface of base 16, and station 114 may be employed to overprint the contrasting color upon background 28. For the embodiment of FIGURE 1, station 114 is used to overprint the contrasting grid 30 and numbering system 38 upon background 28. For the embodiment of FIGURE 8, on the other hand, station 114 is used to overprint the identifying indicia or numbers upon base 28.

It will be appreciated that registration of contrasting colors is equally important in the embodiment of FIGURE 7 wherein the numerals or indicia of contrasting color are printed in clear spots 76, 78, and 80. In this case, station 114 is utilized to print the numerals in spots 76, 78, and 80, and owing to the fact that the orientation of base 26 is preserved by keeping it clamped in grippers 116, the numerals will be properly positioned in the spots without overlapping background 28. In the case where the numbers printed in spots 76, 78, and 80 are of the same color as background 28, both the background and numbers may simultaneously be printed on the same surface of the base by a single plate at the same station.

It will also be appreciated that the order of printing the contrasting colors may be reversed. For example, station 112 may be employed to first print grid 30 upon one surface of the clamped base. Station 114 is then utilized to overprint the background 28 upon grid 30. In either case, it is clear that the card will be printed only on one side and that one of the contrasting colors will be overprinted upon the other.

Prior to this invention, it was proposed to print a background on one surface of a base and a grid on the opposite surface of the base. This method would require the base to be unclamped for the second printing with the result that the orientation of the base would be disturbed. In such a case, proper re-alignment of the base for the second printing is extremely difficult and as a practical matter impossible. As a consequence, precise registration of the background and grid cannot be achieved where the grid and background are printed on opposite sides of the base.

FIGURES 11–16 illustrate a novel method whereby extremely accurate registration of spots identifying common and germane information on a series of printed cards is achieved. In this connection, it will be recalled that identification of information common to multiple primary values is accomplished by removing from a deck or set of cards those optical coincidence cards which are identified with the selected primary values, stacking and aligning the selected cards, and observing the identifying code where clear spots on the selected cards are in alignment, allowing light to be transmitted through the entire aligned stack. Since a considerable number of cards may be selected for determining common information thereon, it is apparent that even the slight misalignment of spots representing the common information on the different cards, would result in difficulty in observing the location of the spots having common information for the selected primary values and could easily result in errors in ascertaining the common items of information.

The present invention avoids the foregoing difficulties by first preparing a master card 130 (see FIGURE 11) containing all the clear spots that can possibly appear in each optical coincidence card 20 in a given set of such cards. The master card may be made in the manner previously described. Alternatively, a photo-type setting machine may be used to print the master card. The master card also may be prepared by using a coordinate plotting machine.

A punched tape provided by a computer may be employed to furnish command signals for operating the photo-type setting machine mentioned above. Likewise, the coordinate plotting machine may be driven by a computer. In place of these combinations, a computer-printer may be employed to print the master card.

As shown in FIGURE 11, the clear, light transmitting spots in master card 130 are indicated at 132. They normally are arranged in parallel rows extending both horizontally and vertically. The remainder of master card 130 is substantially opaque to preclude the transmission of light. Spots 132 are therefore photographically contrasted with the remaining surface of card 130.

All of the optical coincidence cards in the set of coincidence cards to be produced are prepared from master card 130. This is accomplished by providing and applying a separate mask to master card 130 for each coincidence card in the set and by photocopying the masked master card.

For example, let it be assumed that cards **20*c* and 20*d*, as shown in FIGURES 12 and 13, are to be prepared in making up an information retrieval deck. Card 20*c* has only two clear spots indicated at 134 and 135, and card 20*d* has three clear spots indicated at 136, 137, and 138. When cards 20*c* and 20*d* are stacked and aligned, only spots 134 and 136** will be in alignment.

To make card **20*c*, master card 130 is masked, as shown in FIGURE 14, to block transmittal of light through all spots except those corresponding to spots 134 and 135 as indicated at 134*a* and 135*a*. The masked master card illustrated in FIGURE 14 is then photocopied to produce a photoreproduction or what may be referred to as a plate negative 140 (FIGURE 15) wherein the opaque and light-transmitting portions of the master's image are reversed. Thus in the photocopy of FIGURE 15 the unmasked spots of the master appear as opaque spots indicated at 141** and the remainder of this photocopy is transparent.

From the photocopied negative shown in FIGURE 15, a printing plate (not shown) is made in a conventional manner and is inserted into its appropriate station of printer 110 for printing card **20*c***.

To make card **20*d*, the mask used for making the photocopy of card 20*a* is replaced with another mask which, as shown in FIGURE 16, blocks transmittal of light through all spots except those corresponding to spots 136, 137, and 138 as indicated at 144. Master card 130, with its new mask is again photocopied to produce a further photoreproduction or negative plate which is then employed to make another printing plate for card 20*d*. When card 20*d* is printed from this latter plate, spots 134 and 136 will be in accurate alignment with each other when cards 20*c* and 20*d* are stacked and aligned because the same spot on master card 130 was used to produce the aligning spots on cards 20*c* and 20*d***.

Any number of different coincidence cards may be made from the same master card in the manner just described. The retrieval of information when a large number of cards are stacked together is assured as a result of the precise registration of spots provided by the method just described.

Masking of master card 130 may be accomplished by selectively applying removable, opaque strips of adhesive material to one surface of the master as indicated at 150 in FIGURES 14 and 16. Alternatively, the masks for master card 130 may be produced by a photo-type setting machine which may automatically be driven by punched tape or other information media containing command signals from a computer. Information furnished to the computer thus provides for the automatic production of the masks which are superimposed by the photo-type setting machine on master card 130. The masks may be produced and applied by a coordinate plotting machine which also may be driven automatically by a computer. A computer-printer also may be employed to print the masks. In each case, the mask applied to master card 130 is removable in any suitable and conventional manner to enable other masks to be applied successively in producing a series of coincidence card printing plates from the same master.

The masking characters printed out by the photo-type setting machine or the other devices mentioned above will be made larger than the clear spots in master card 130. As a result, the printed characters will completely mask out the unwanted spots on the master. These characters may be circular, and the spots in master card 130 may be of any selected shape for conveying information in the manner previously described.

It also is envisioned that masking elements or characters may be printed on paper or the like which is then photographed to provide a mask in film-image form. The thusly produced mask is then applied to master card 130 as previously described.

With computer-based data, information in an optical coincidence card system as described herein may readily be updated or modified by employing the masking technique just explained. For example, a new mask containing updated information can be produced by a computer driven photo-type setting machine and superimposed on the original master card which was used to prepare a given set of coincidence cards. From the masked master card a new plate negative is produced for making a new printing plate. A new coincidence card is then printed to replace an existing card in the set of cards which were originally made from the master, thus updating or modifying the information in the set of optical coincidence cards without adversely affecting the registration of spots representing common items of information.

With a computer-printer, computer driven, photo-type setting machine, or a computer driven coordinate plotting machine, a final master print can be produced from which the printing press plates are directly made.

As compared with prior methods which drill or punch holes in the cards, the method of this invention, wherein a master card is prepared and photocopied, is particularly advantageous because the size of the photocopy spots 141 may be varied infinitely by controlling the photocopying process in a known manner. The size of the ink-free or background-free areas on the final optical coincidence cards prepared in accordance with this invention are thus readily and infinitely variable to conform to a vast array of applications and conditions. The size of the grid printed on the coincidence card can also be controlled in the same manner as described for the ink-free areas. In other words, a master grid can be photocopied, and the printing plate for printing the grid can be prepared from the photoreproduction. Therefore, the size of the grid and size of the ink-free areas may be varied while at the same time preserving the accuracy of registration of the grid relative to the ink-free areas as well as preserving the precise alignment and size of ink-free areas representing common items of information on different cards.

A further significant improvement in the optical coincidence cards of this invention resides in the use of clear plastic in making base 26. Clear plastic has a decided visual advantage over paper. For example, when a large number of coincidence cards made according to this invention are stacked together, no special lighting devices are required to transmit light through the aligning spots, whereas prior paper based cards require a strong light source placed on the back side of the stack for reading out the aligned spots.

To minimize errors in mis-filing the optical coincidence cards in a given deck, the cards may be successively numbered as indicated at 152 in FIGURES 12 and 13. The successively numbered cards furthermore may be divided in a number of groups wherein the cards in each group are successively numbered and wherein the color of the card backgrounds 28 are the same for each group, but different as compared with the background colors of the cards in each of the remaining groups. For example, a first group may contain cards numbered 1–10, a second group may contain cards numbered 11–20, and a third group may contain cards numbered 21–30. The backgrounds of the cards in the first, second, and third groups advantageously may respectively be colored yellow, green, and red. Thus, the cards in the entire deck may be located or filed quite readily in their associated groups simply by the coloring of the backgrounds.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. An improved optical coincidence device for indexing items of information germane to a selected primary value comprising a base of clear, transparent plastic material, a coating covering and contracting with a surface of said base, means for identifying on the coating covered surface discrete locations each representing one of a number of items of information, there being at at least one of said locations an area of selected configuration which is free of said coating to expose said base and thereby provide a clear light transmitting spot for identifying an item of information germane to said primary value by visual inspection, said coating and said identifying means being printed in contrasting colors only on one side of said base, with one of said colors being overprinted upon the other to provide an accurate registration of said identifying means with said at least one clear spot.

2. The improved optical coincidence device defined in claim 1, wherein said identifying means comprises a grid dividing said coating into discrete ordered spaces defining said locations and indicia for uniquely identifying each of said spaces.

3. An information retrieval system of the optical coincidence type comprising a deck of optical coincidence cards for indexing items of information germane to different ones of a set of selected primary values, each of said cards including a base of clear, transparent plastic material, a coating covering and contrasting with a surface of said base, and information identifying means including a location-identifying grid on said base for dividing said coating into discrete, ordered spaces, indicia means forming a part of said information identifying means and being disposed on said base for uniquely identifying each of said spaces, there being at at least one of said spaces an area of selected configuration which is free of said coating to expose said base and thereby provide a clear light-transmitting spot for identifying an item of information germane to the associated primary value by visual inspection, said coating and said information identifying means being respectively printed in contrasting colors only on one side of said base, with one of said colors being overprinted upon the other, said deck being divided into separate groups containing successively numbered cards, the color of the coatings of the cards in each group being the same and different from the color of the coating of cards in the other groups to provide a filing code by which the cards in said deck may be located in their proper groups.

4. An improved optical coincidence device for indexing items of information germane to a selected primary value, comprising:

(a) a base;

(b) means covering and contrasting with a surface of said base; and (c) means for identifying on the surface of said base discrete ordered locations each representing one of a number of items of information;

(d) there being at different ones of said locations areas free of said contrasting means and exposing said base, said areas being of at least two different configurations, whereby said areas by their locations identify items of information germane to said primary values, said areas having a plurality of different configurations to further identify the items of information represented thereby or the primary values to which a given item of information is germane.

References Cited

UNITED STATES PATENTS

| | | | |
|---|---|---|---|
| 1,165,465 | 12/1915 | Taylor | 35—20 |
| 2,157,036 | 5/1939 | Torkelson | 35—48 |
| 2,665,473 | 12/1954 | Wilckens. | |
| 3,042,912 | 7/1962 | Gilbert. | |
| 3,171,021 | 2/1965 | Jonker | 235—61.12 |
| 3,186,111 | 6/1965 | Lawlor | 35—17 |
| 3,203,116 | 8/1965 | Shaw | 35—48 |

OTHER REFERENCES

Casey et al.: "Punched Cards," 2nd Edition, Reinhold, N.Y., 1958, Chapter 6.

Wendt: "Novel Indexing Device Solves Technical Filing Problems," Product Engineering, pp. 48 and 49, Jan. 16, 1961.

MAYNARD R. WILBUR, Primary Examiner

THOMAS J. SLOYAN, Assistant Examiner

U.S. Cl. X.R.

129—16.7

UNITED STATES PATENT OFFICE

CERTIFICATE OF CORRECTION

Patent No. 3,480,764 November 25, 1969

Roger D. Marshall

It is certified that error appears in the above identified patent and that said Letters Patent are hereby corrected as shown below:

Column 3, line 12, "classi,cation" should read -- classification --; line 28, "sytems" should read -- systems --. Column 5, line 55, "case" should read -- ease --; line 6, "housands" should read -- thousands --. Column 7, line 45, "2072" should read -- 2872 --; line 61, "acts" should read -- sets --. Column 8, line 23, "mentionad" should read -- mentioned --; line 58, "i should read -- is --. Column 9, line 50, "9" should read -- 8 --; line 50, cancel "line 50". Column 11, line 4, "60" should read -- 68 --; line 68, "car" should read -- card --. Column 16 line 17, "contracting" should read -- contrasting --.

Signed and sealed this 13th day of October 1970.

(SEAL)
Attest:

EDWARD M.FLETCHER,JR.
Attesting Officer

WILLIAM E. SCHUYLER, JR.
Commissioner of Patents